(12) United States Patent
Nolan et al.

(10) Patent No.: US 12,227,225 B2
(45) Date of Patent: Feb. 18, 2025

(54) SINGLE STALK STEERING ASSEMBLY

(71) Applicant: GM GLOBAL TECHNOLOGY OPERATIONS LLC, Detroit, MI (US)

(72) Inventors: Kyle Patrick Nolan, Royal Oak, MI (US); Victor Wong, Lake Orion, MI (US); Cameron Tyler Knight, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/341,948

(22) Filed: Jun. 27, 2023

(65) Prior Publication Data

US 2025/0002071 A1     Jan. 2, 2025

(51) Int. Cl.
| | |
|---|---|
| *B62D 1/22* | (2006.01) |
| *B60K 35/10* | (2024.01) |
| *B60R 21/203* | (2006.01) |
| *B60K 35/60* | (2024.01) |

(52) U.S. Cl.
CPC ............... *B62D 1/22* (2013.01); *B60K 35/10* (2024.01); *B60R 21/203* (2013.01); *B60K 35/60* (2024.01); *B60K 2360/128* (2024.01); *B60K 2360/782* (2024.01)

(58) Field of Classification Search
CPC ........... B62D 1/22; B62D 1/043; B62D 1/046
See application file for complete search history.

(56) References Cited

U.S. PATENT DOCUMENTS

| | | | | |
|---|---|---|---|---|
| 1,129,852 A | * | 3/1915 | Custer .................... | B62D 1/043 74/495 |
| 1,171,853 A | * | 2/1916 | Kohl ....................... | B62D 1/043 74/557 |
| 1,555,599 A | * | 9/1925 | Ontiveros .............. | B62D 1/043 74/557 |
| 1,865,072 A | * | 6/1932 | Appleman ............. | B62D 1/043 74/557 |

(Continued)

FOREIGN PATENT DOCUMENTS

| | | | | |
|---|---|---|---|---|
| CN | 114248827 B | | 6/2023 | |
| DE | 10052537 C1 | * | 5/2002 | ............. B62D 1/043 |

(Continued)

OTHER PUBLICATIONS

German Office Action from counterpart DE1020231271776, dated Sep. 9, 2024.

*Primary Examiner* — Thomas C Diaz

(57) ABSTRACT

A steering control assembly including: a base configured to couple with a steering shaft; a ring mounted to the base and configured to rotate independent of the base; a locking member movable between a locked configuration and an unlocked configuration, in the locked configuration the locking member locks the ring to the base to restrict rotation of the ring independent of the base, and in the unlocked configuration the ring is free to rotate independent of the base; and a handle mounted to the ring and rotatable with the ring independent of the base when the locking member is in the unlocked configuration to adjust a radial position of the handle relative to the base, the handle configured to be grasped by a user to rotate the steering control assembly and the steering shaft when the locking member is in the locked configuration.

19 Claims, 3 Drawing Sheets

(56) References Cited

U.S. PATENT DOCUMENTS 1,901,171 A * 3/1933 Kauffman ............. B62D 1/043
74/557
10,144,383 B2 * 12/2018 Bodtker ................ B62D 1/046

FOREIGN PATENT DOCUMENTS

JP 2008105521 A 5/2008
KR 102118012 B1 6/2020

* cited by examiner

SINGLE STALK STEERING ASSEMBLY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a single stalk steering assembly for a vehicle.

Most vehicles include a steering wheel for steering the vehicle. To turn the front wheels of the vehicle to the right, the steering wheel is turned clockwise. To turn the front wheels to the left, the steering wheel is turned counterclockwise. Steering wheels are used in non-vehicular applications as well, such as to operate machinery, for example.

SUMMARY

The present disclosure includes, in various features, a steering control assembly including the following: a base configured to couple with a steering shaft; a ring mounted to the base and configured to rotate independent of the base; a locking member movable between a locked configuration and an unlocked configuration, in the locked configuration the locking member locks the ring to the base to restrict rotation of the ring independent of the base, and in the unlocked configuration the ring is free to rotate independent of the base; and a handle mounted to the ring and rotatable with the ring independent of the base when the locking member is in the unlocked configuration to adjust a radial position of the handle relative to the base, the handle configured to be grasped by a user to rotate the steering control assembly and the steering shaft when the locking member is in the locked configuration.

In further features, the steering control assembly includes bearings between the base and the ring.

In further features, the bearings are roller bearings between a circular flange of the base and the ring.

In further features, the base includes a base flange defining an aperture, the aperture configured to receive the steering shaft therein to couple the base to the steering shaft.

In further features, the base includes a plurality of surface ridges, the locking member is configured to cooperate with any of the plurality of surface ridges to rotationally lock the ring to the base.

In further features, the plurality of surface ridges are arranged at least 180° about the base.

In further features, a plurality of control buttons are mounted to the base.

In further features, the ring is included with a cover that covers at least a portion of a front side of the steering control assembly.

In further features, the cover defines an opening for an airbag included with the steering control assembly.

In further features, the handle is adjustable in height.

In further features, the handle is tiltable towards and away from a front of the steering control assembly.

In further features, the handle includes a base plate and a prong extending from the base plate.

In further features, a post extends from the base plate, the post is seated within a receptacle defined by a support member mounted to the ring, the support member is rotatable towards and away from a front of the steering control assembly.

In further features, the support member is connected to the ring with a fastener.

The present disclosure further includes, in various features, a steering control assembly including the following: a base configured to couple with a steering shaft of a vehicle such that rotation of the base rotates the steering shaft; a button bank including a plurality of control buttons mounted to the base; a ring mounted to the base and configured to rotate independent of rotation of the base; a locking member configured to rotationally lock the ring relative to the base; a plurality of bearings between the base and the ring; and a handle mounted to the ring and rotatable with the ring independent of the base, the handle configured such that both a height and a tilt angle of the handle are adjustable.

In further features, the handle is included with a stalk assembly including a support member mounted with a fastener to a ring post extending from the ring, the support member defining a receptacle with a stalk post seated therein, the stalk post is mounted to the handle and configured to be supported within the receptable at a plurality of different heights to adjust the height of the handle.

In further features, the locking member is a locking tab pivotably mounted to the ring and configured to cooperate with surface ridges of the base to rotationally lock the ring relative to the base.

In further features, the locking tab is biased to cooperate with the surface ridges.

The present disclosure still further includes, in various features, a steering control assembly including: a base configured to couple with a steering shaft of a vehicle such that rotation of the base rotates the steering shaft; a button bank including a plurality of control buttons mounted to the base; a ring mounted to the base and configured to rotate independent of rotation of the base; a locking member movable between a locked configuration and an unlocked configuration, in the locked configuration the locking member locks the ring to the base to restrict rotation of the ring independent of the base, and in the unlocked configuration the ring is free to rotate independent of the base; a plurality of roller bearings between the base and the ring; and a stalk assembly including a support member mounted with a fastener to a ring post extending from the ring, the stalk assembly is rotatable with the ring independent of the base to adjust a radial position of the stalk assembly relative to the base, the support member defining a receptacle with a stalk post seated therein, the stalk post is mounted to a handle and configured to be supported within the receptable at a plurality of different heights to adjust a height of the handle, and the support member is pivotable about the fastener to adjust a tilt angle of the handle.

In further features, the handle includes at least one prong configured to be grasped by a user to rotate the steering control assembly and the steering shaft when the ring is in the locked configuration.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
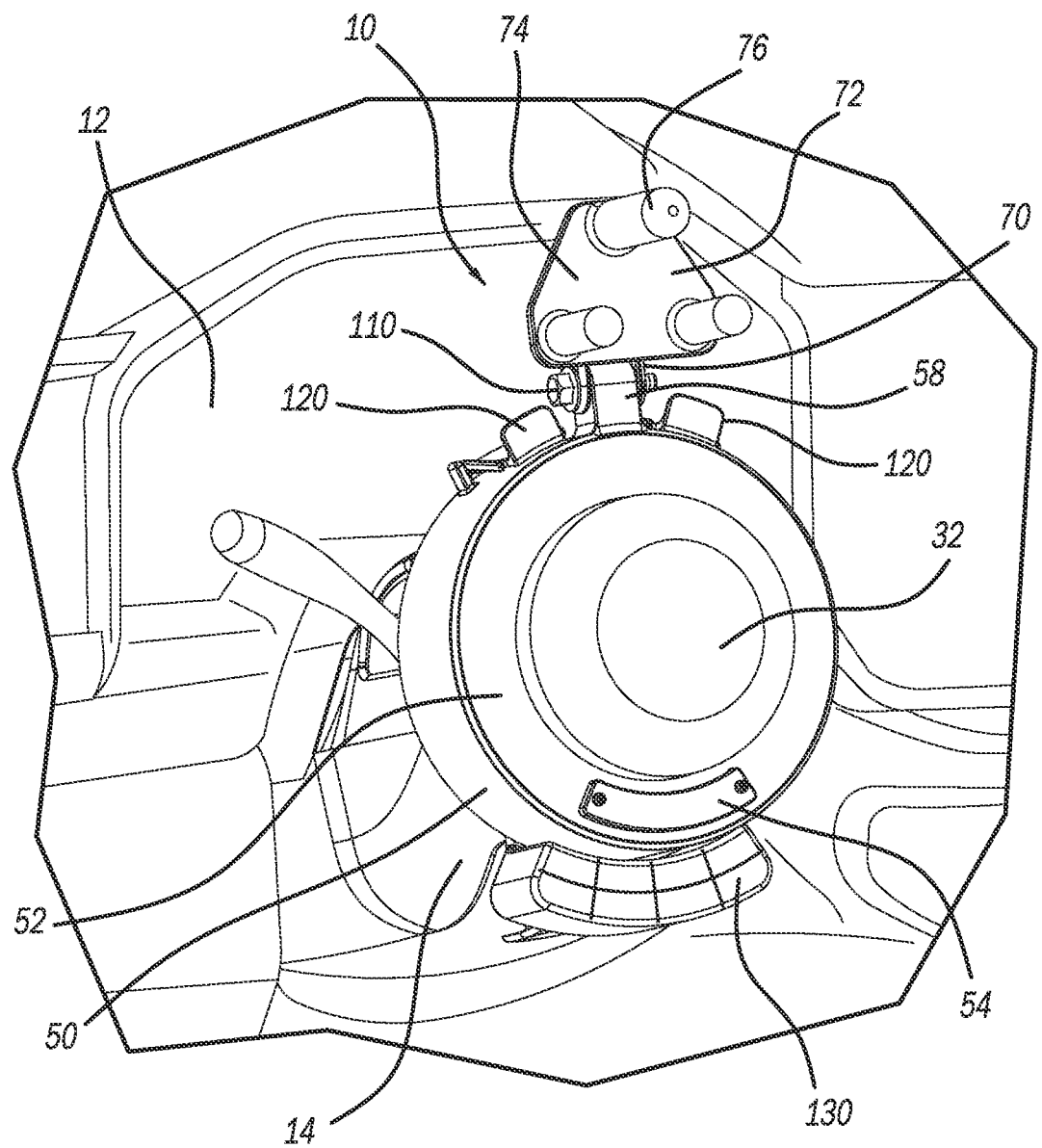
FIG. 1 is a perspective view of a steering control assembly in accordance with the present disclosure.
Figure 2:
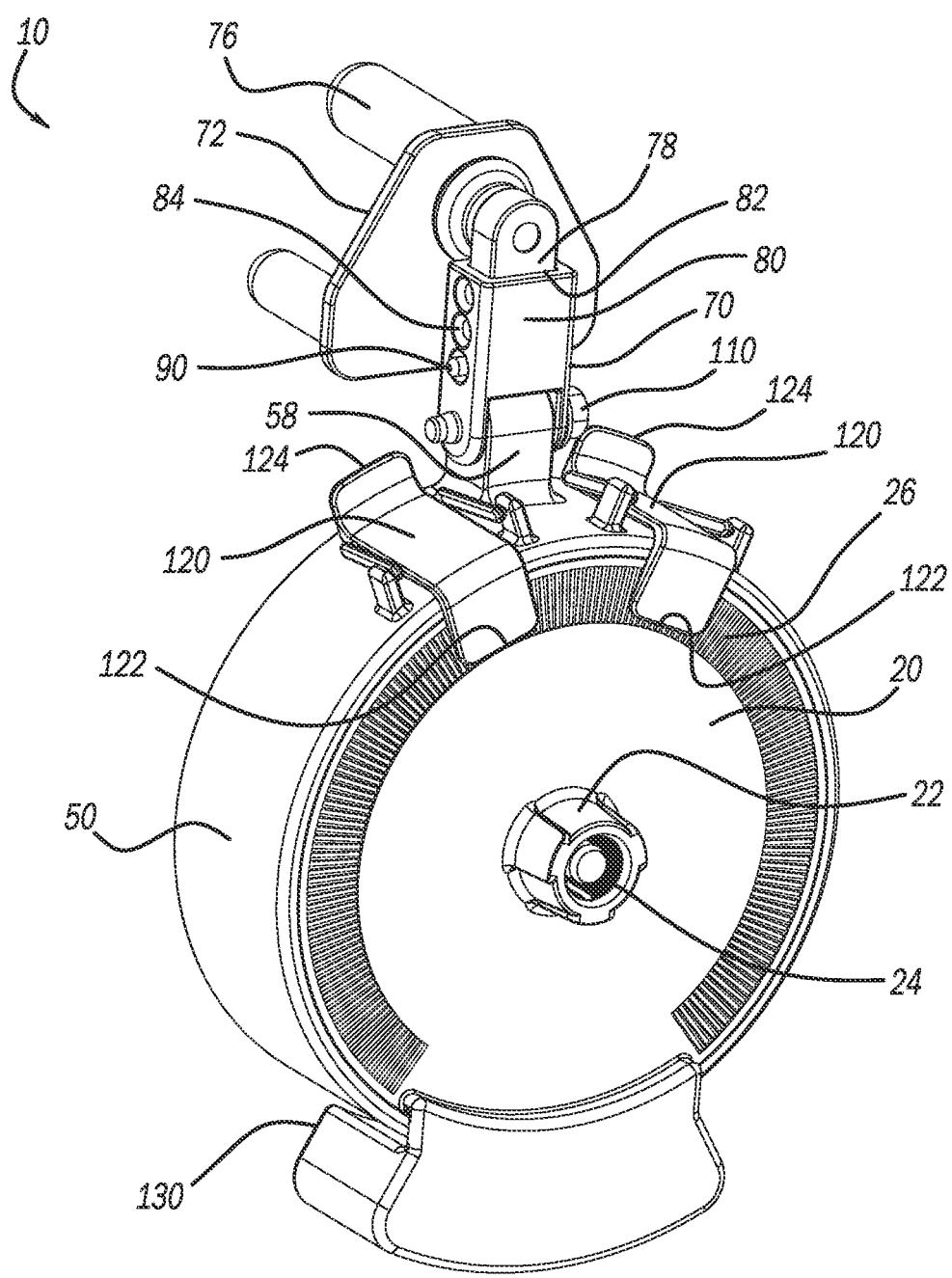
FIG. 2 is another perspective view of the steering control assembly of FIG. 1.
Figure 3:
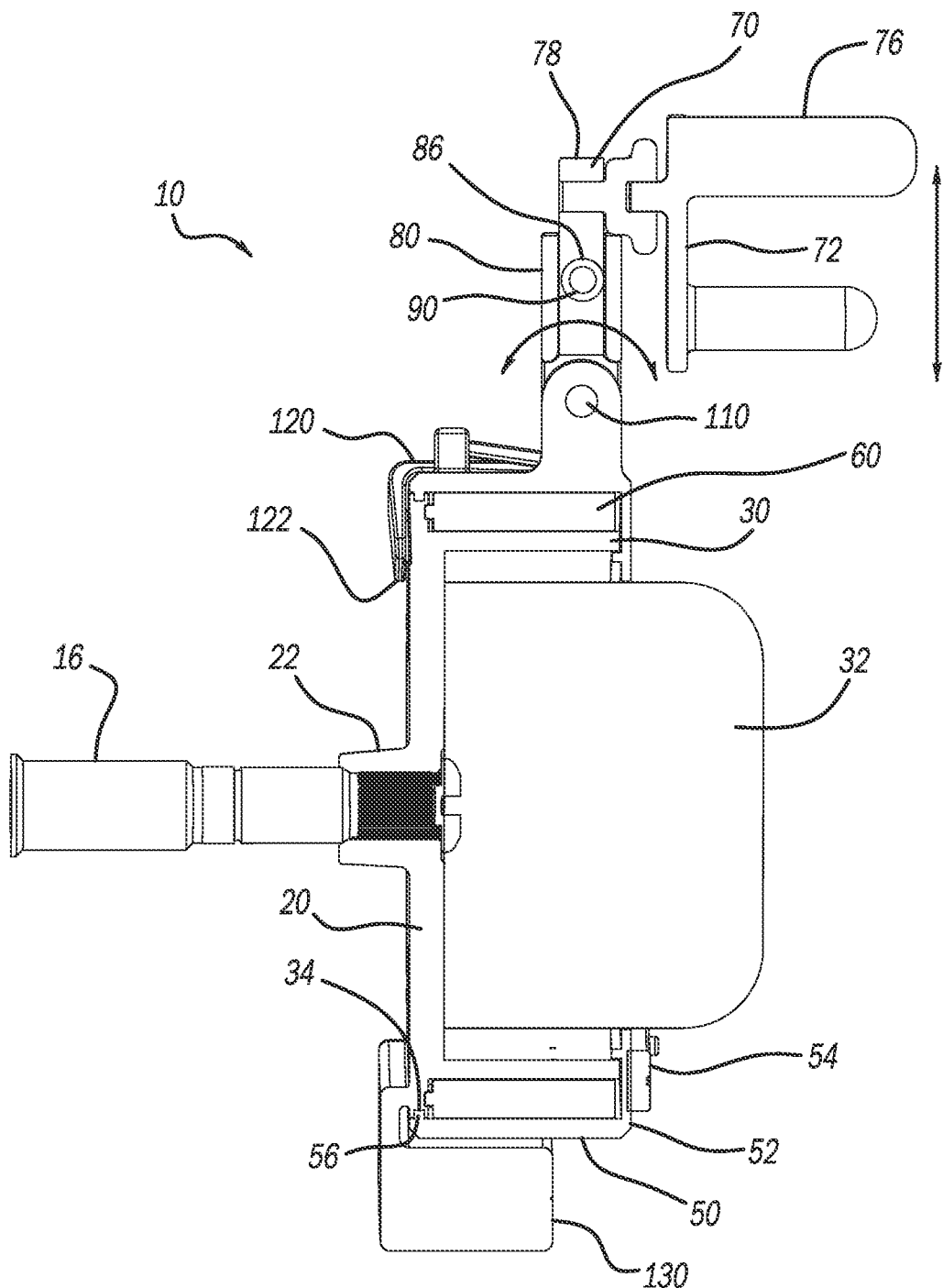
FIG. 3 is a cross-sectional view of the steering control assembly of FIG. 1.

FIGS. 1-3 illustrate an exemplary steering control assembly 10 in accordance with the present disclosure. The steering control assembly 10 is configured to steer the wheels of any suitable vehicle. Suitable vehicles include, but are not limited to, the following: passenger vehicles; mass transit vehicles; recreational vehicles; watercraft; aircraft; construction vehicles; military vehicles, etc. The steering control assembly 10 may also be configured for use in any suitable non-vehicular application. For example, the steering control assembly 10 may be configured for steering, or otherwise controlling, suitable construction equipment, machinery, military equipment, etc.

Although the steering control assembly 10 is generally described as a control assembly for steering wheels of a vehicle, the steering control assembly 10 may be configured for steering components other than wheels, such as, but not limited to, a rudder, sail, or any other suitable structure configured to control a heading of a vehicle. Furthermore, the steering control assembly 10 may be configured to control any aspect of a vehicle or non-vehicular machine other than steering. The steering control assembly 10 is configured to facilitate control of any suitable vehicle, machinery, equipment, etc. by handicapped persons, such as persons with limited to no functionality of their hands. The steering control assembly 10 is also configured for use by non-handicapped persons as well.

In the examples illustrated, the steering control assembly 10 is configured to be mounted within a vehicle opposite to a dashboard 12 at the end of a steering column 14. The steering control assembly 10 is configured to cooperate with a steering shaft 16 (FIG. 3) of a vehicle. Rotation of the steering shaft 16 by the steering control assembly 10 controls left and right directional movement of the wheels of the vehicle. Thus, rotating the steering control assembly 10 clockwise will rotate the steering shaft 16 clockwise, which results in the wheels rotating to the right. Rotating the steering control assembly 10 counterclockwise rotates the steering shaft 16 counterclockwise, which rotates the wheels to the left.

As illustrated in FIGS. 1-3, the steering control assembly 10 generally includes a base 20, a ring 50 configured to rotate, and a stalk assembly 70. The base 20 is coupled to the steering shaft 16, such that rotation of the base 20 rotates the steering shaft 16. The ring 50 is mounted to the base 20. The stalk assembly 70 is mounted to the ring 50. The ring 50 is rotatable independent of the base 20, and may be locked at any suitable position relative to the base 20. Thus, the rotational or radial position of the stalk assembly 70 relative to the base 20 may be adjusted according to user preference. The stalk assembly 70 is also adjustable in height, and is rotatable both towards and away from the operator of the steering control assembly 10 (see FIG. 3, for example). Adjustability of the stalk assembly 70 is described further herein.

With particular reference to FIGS. 2 and 3, the base 20 includes a flange 22 extending from an outer surface of the base 20. The flange 22 defines an aperture 24, which is configured to receive the steering shaft 16 therein. In the example illustrated, the flange 22 includes internal threads within the aperture 24, which are configured to cooperate with threads of the steering shaft 16 to rotationally lock the steering control assembly 10 to the steering shaft 16. Thus, rotation of the steering control assembly 10 also rotates the steering shaft 16. The outer surface of the base 20 also includes a plurality of surface features, which are configured to cooperate with locking members 120 as described further herein. The surface features may be configured in any suitable manner. For example, the surface features may be configured as surface ridges 26, which define recesses therebetween. The surface ridges 26 may be configured as tabs configured to cooperate with the locking members 120. The surface ridges 26 may extend any suitable distance about the base 20. For example, the surface ridges 26 may extend at least about 180° about the base 20. With particular reference to FIG. 3, the base 20 further includes a circular flange 30, which extends about an axial center of the base 20. In applications where the steering control assembly 10 includes an airbag 32, the airbag 32 may be mounted at a center of the base 20 and surrounded by the circular flange 30.

The ring 50 is mounted to the base 20 in any suitable manner so that the ring 50 is rotatable relative to the base 20. For example, and as illustrated in FIG. 3, the ring 50 includes a flange 56, which is seated in a recess 34 defined by the base 20. The ring 50 is rotatable independent of rotation of the base 20. Thus, even when the base 20 and the steering shaft 16 connected thereto are stationary, the ring 50 is rotatable clockwise and counterclockwise to adjust the radial position of the stalk assembly 70.

The steering control assembly 10 further includes a cover 52 at a front side thereof facing the driver/operator. The ring 50 may be part of, or separate from, the cover 52. In the example illustrated, the ring 50 and the cover 52 are integral as a single component. In other applications, however, the cover 52 and the ring 50 may be separate components. In the example of FIGS. 1-3, the cover 52 extends around the airbag 32. The cover 52 includes a counterbalance 54, which is a weight that balances out the weight of the stalk assembly 70.

To facilitate independent rotation of the ring 50 relative to the base 20, bearings 60 are included between the circular flange 30 of the base 20 and the ring 50. The bearings 60 may be any suitable bearings, such as roller bearings, for example. The bearings 60 may be configured to retain the ring 50 to the base 20 to prevent the ring 50 from being pulled off the base 20 when the rotational position of the ring 50 relative to the base 20 is adjusted.

The stalk assembly 70 includes a handle 72, which is configured in any suitable manner to be grasped by a user to rotate the ring 50. In the example illustrated, the handle 72 includes a base plate 74 with multiple prongs 76 or pins extending therefrom. The figures illustrate three prongs 76, but the handle 72 may have any other suitable number of prongs 76, such as more or less than three prongs 76. The handle 72 may be configured in any other suitable manner. For example, instead of prongs 76, the handle 72 may include a steering wheel spinner knob, or any other suitable structure configured to be grasped or otherwise contacted by a user to rotate the ring 50.

The handle 72 is mounted to a ring post 58 of the ring 50 in any suitable manner. For example, the stalk assembly 70 may include a post 78 connected to a rear surface of the base plate 74. With particular reference to FIGS. 2 and 3, the post 78 is in cooperation with a support member 80. More specifically, the support member 80 defines a receptacle 82 in which the post 78 is seated. The support member 80 is mounted to the ring post 58 with any suitable fastener 110. The post 78 is retained within the support member 80 at any suitable height. For example, and as illustrated in FIG. 3, the support member 80 defines a plurality of apertures 84. The post 78 includes one or more openings 86 extending therethrough, as illustrated in FIG. 3. A locking pin 90 is inserted through the opening 86 of the post 78, and through any one of the apertures 84 of the support member 80 to retain the post 78 within the receptacle 82 at a selected height. Although the figures illustrate three of the apertures 84, any suitable number of apertures 84 may be included.

The height of the stalk assembly 70 may be adjusted by removing the locking pin 90, which will allow the handle 72 to be raised or lowered. Once the handle 72 is at a desired height, the locking pin 90 is inserted through the aperture 84 of the support member 80. More specifically, at a maximum height, the locking pin 90 will be inserted through the uppermost one of the apertures 84. At a lowermost height, the locking pin 90 will be inserted through the lowest aperture 84, such as illustrated in FIG. 2.

The stalk assembly 70 is also adjustable with respect to the angle of the stalk assembly 70 towards or away from the user of the steering control assembly 10, as the directional arrows of FIG. 3 indicate. For example, loosening the fastener 110 connecting the support member 80 to the ring post 58 will allow the stalk assembly 70 to be rotated towards or away from the operator. When the stalk assembly 70 is at a desired angle relative to the operator, the fastener 110 is then tightened to lock the stalk assembly 70 at the set angle relative to a front of the steering control assembly 10 and relative to the operator. The stalk assembly 70 may have any other suitable locking mechanisms for positioning and locking the height of the handle 72, as well as the angle at which the handle 72 is positioned relative to the ring 50 and the operator of the steering control assembly 10.

Rotational adjustment of the stalk assembly 70 will now be described. The locking members 120 are configured to couple the ring 50 to the base 20 to rotationally lock the ring 50 relative to the base 20. The locking members 120 may be mounted to the ring 50 in any suitable manner, as illustrated in FIGS. 1-3. Alternatively, the locking members 120 may be mounted at any other suitable location to restrict rotation of the ring 50 relative to the base 20. In the example illustrated, two locking members 120 are included. But any other suitable number of locking members 120 may be included, such as only one of the locking members 120 or more than two of the locking members 120.

The locking members 120 may each be configured as any type of locking member suitable to releasably couple the ring 50 to the base 20 to restrict relative rotation therebetween. For example, the locking members 120 may be configured as locking tabs or latches. In the example illustrated, each locking member 120 includes a distal end 122 opposite to the surface ridges 26 of the base 20. Opposite to the distal end 122 is a proximal end 124. In the example illustrated, the locking members 120 are pivotably mounted to the ring 50 such that depressing each proximal end 124 pivots or rotates each locking member 120 to lift the distal ends 122 from cooperation with the surface ridges 26. When the distal ends 122 are decoupled from the base 20, the ring 50 may be rotated relative to the base 20, which allows the stalk assembly 70 to be rotated relative to the base 20 to any suitable position preferred by a user. Once the stalk assembly 70 is rotated to the desired position, the locking members 120 are released to allow the distal ends 122 to move into cooperation with the surface ridges 26 to again lock the ring 50 to the base 20 to prevent independent rotation therebetween.

The steering control assembly 10 further includes one or more control buttons or switches mounted to the base 20. In the example illustrated, a plurality of buttons are arranged in a button bank 130 mounted to the base 20. Thus, when the stalk assembly 70 is rotated relative to the base 20, the stalk assembly 70 is also rotated relative to the button bank 130.

The steering control assembly 10 may be configured as a steering wheel replacement for users who require or prefer a single point of steering contact, such as a spinner knob or a tri-pin. The steering control assembly 10 does not include a standard steering wheel rim, but instead includes the stalk assembly 70. The elimination of unneeded steering wheel material makes it easier to get into and out of the vehicle, as well as to shift into place once in the driver's seat. This allows the user to make use of about the same amount of space as if the steering wheel was removed entirely. This is a benefit for people who have difficulty with vehicle ingress and egress. Additional benefits of the present disclosure include adjustability of the stalk assembly 70. The stalk assembly 70 is adjustable in height, may be rotated towards or away from the operator, and may be rotated relative to the base 20 about a rotational axis of the steering control assembly 10. Not only is the user able to fine tune a comfortable driving position, but the user is also able to customize steering effort by changing the length of the stalk assembly 70. As the stalk assembly 70 is shortened, the steering effort is increased. And as the stalk assembly 70 is lengthened, the steering effort is reduced. The prongs 76 may be replaced with any other suitable type of handle, such as a spinner handle for example.

The present disclosure also includes one or more steering wheel control buttons at the button bank 130, which rotates along with the base 20. All of the buttons and functions that are often located on opposite sides of a steering wheel are relocated to the button bank 130 generally positioned below the airbag 32. As a result, the user can reach any of the desired buttons with one hand in one location. The present disclosure further provides the driver/operator with greater visibility. By including only the single stalk assembly 70, the driver/operator will have enhanced visibility of the dashboard 12, the vehicle start/stop button, etc. The present disclosure provides numerous additional advantages as well, as one skilled in the art will appreciate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A steering control assembly comprising:
a base configured to couple with a steering shaft;
a ring mounted to the base and extending around an outermost base circumference of the base, the ring configured to rotate independent of the base;
a locking member movable between a locked configuration and an unlocked configuration, in the locked configuration the locking member locks the ring to the base to restrict rotation of the ring independent of the base, and in the unlocked configuration the ring is free to rotate independent of the base;
bearings between the base and the ring; and
a handle mounted to the ring and extending radially outward beyond an outermost ring circumference of the ring, the handle rotatable with the ring independent of the base when the locking member is in the unlocked configuration to adjust a radial position of the handle relative to the base, the handle configured to be grasped by a user to rotate the steering control assembly and the steering shaft when the locking member is in the locked configuration.

2. The steering control assembly of claim 1, wherein the bearings are roller bearings between a circular flange of the base and the ring.

3. The steering control assembly of claim 1, wherein the base includes a base flange defining an aperture, the aperture configured to receive the steering shaft therein to couple the base to the steering shaft.

4. The steering control assembly of claim 1, wherein the base includes a plurality of surface ridges, the locking member is configured to cooperate with any of the plurality of surface ridges to rotationally lock the ring to the base.

5. The steering control assembly of claim 4, wherein the plurality of surface ridges are arranged at least 180° about the base.

6. The steering control assembly of claim 1, further comprising a plurality of control buttons mounted to the base.

7. The steering control assembly of claim 1, wherein the ring is included with a cover that covers at least a portion of a front side of the steering control assembly.

8. The steering control assembly of claim 7, wherein the cover defines an opening for an airbag included with the steering control assembly.

9. The steering control assembly of claim 1, wherein the handle is adjustable in height.

10. The steering control assembly of claim 9, wherein the handle is tiltable towards and away from a front of the steering control assembly.

11. The steering control assembly of claim 1, wherein the handle includes a base plate and a prong extending from the base plate.

12. The steering control assembly of claim 11, further comprising a post extending from the base plate, the post is seated within a receptacle defined by a support member mounted to the ring, the support member is rotatable towards and away from a front of the steering control assembly.

13. The steering control assembly of claim 12, wherein the support member is connected to the ring with a fastener.

14. A steering control assembly comprising:
a base configured to couple with a steering shaft of a vehicle such that rotation of the base rotates the steering shaft;
a button bank including a plurality of control buttons mounted to the base;
a ring mounted to the base and configured to rotate independent of rotation of the base;
a locking member configured to rotationally lock the ring relative to the base;
a plurality of bearings between the base and the ring; and
a handle mounted to the ring and rotatable with the ring independent of the base, the handle configured such that both a height and a tilt angle of the handle are adjustable.

15. The steering control assembly of claim 14, wherein the handle is included with a stalk assembly including a support member mounted with a fastener to a ring post extending from the ring, the support member defining a receptacle with a stalk post seated therein, the stalk post is mounted to the handle and configured to be supported within the receptable at a plurality of different heights to adjust the height of the handle.

16. The steering control assembly of claim 14, wherein the locking member is a locking tab pivotably mounted to the ring and configured to cooperate with surface ridges of the base to rotationally lock the ring relative to the base.

17. The steering control assembly of claim 16, wherein the locking tab is biased to cooperate with the surface ridges.

18. A steering control assembly comprising:
a base configured to couple with a steering shaft of a vehicle such that rotation of the base rotates the steering shaft;
a button bank including a plurality of control buttons mounted to the base;
a ring mounted to the base and configured to rotate independent of rotation of the base;
a locking member movable between a locked configuration and an unlocked configuration, in the locked configuration the locking member locks the ring to the base to restrict rotation of the ring independent of the base, and in the unlocked configuration the ring is free to rotate independent of the base;

a plurality of roller bearings between the base and the ring; and a stalk assembly including a support member mounted with a fastener to a ring post extending from the ring, the stalk assembly is rotatable with the ring independent of the base to adjust a radial position of the stalk assembly relative to the base, the support member defining a receptacle with a stalk post seated therein, the stalk post is mounted to a handle and configured to be supported within the receptacle at a plurality of different heights to adjust a height of the handle, and the support member is pivotable about the fastener to adjust a tilt angle of the handle.

19. The steering control assembly of claim 18, wherein the handle includes at least one prong configured to be grasped by a user to rotate the steering control assembly and the steering shaft when the ring is in the locked configuration.

\* \* \* \* \*